No Printed Specification Available
5404X
2 Sheets—Sheet 1.
I. KNIGHT.
Car Truck.
Patented March 18, 1829.
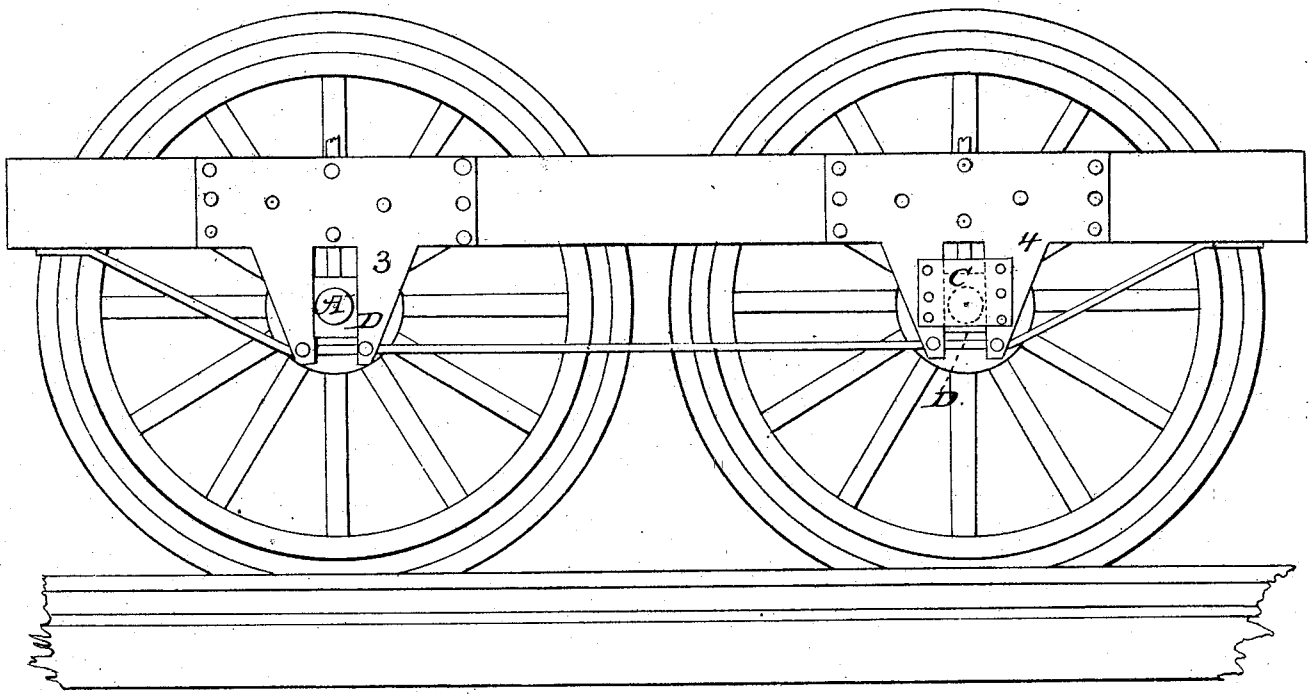
N. PETERS. Photo-Lithographer, Washington, D. C.

No Printed Specification Available
5404X
2 Sheets--Sheet 2.
I. KNIGHT.
Car-Axle Box.
Patented Mar. 18. 1829.
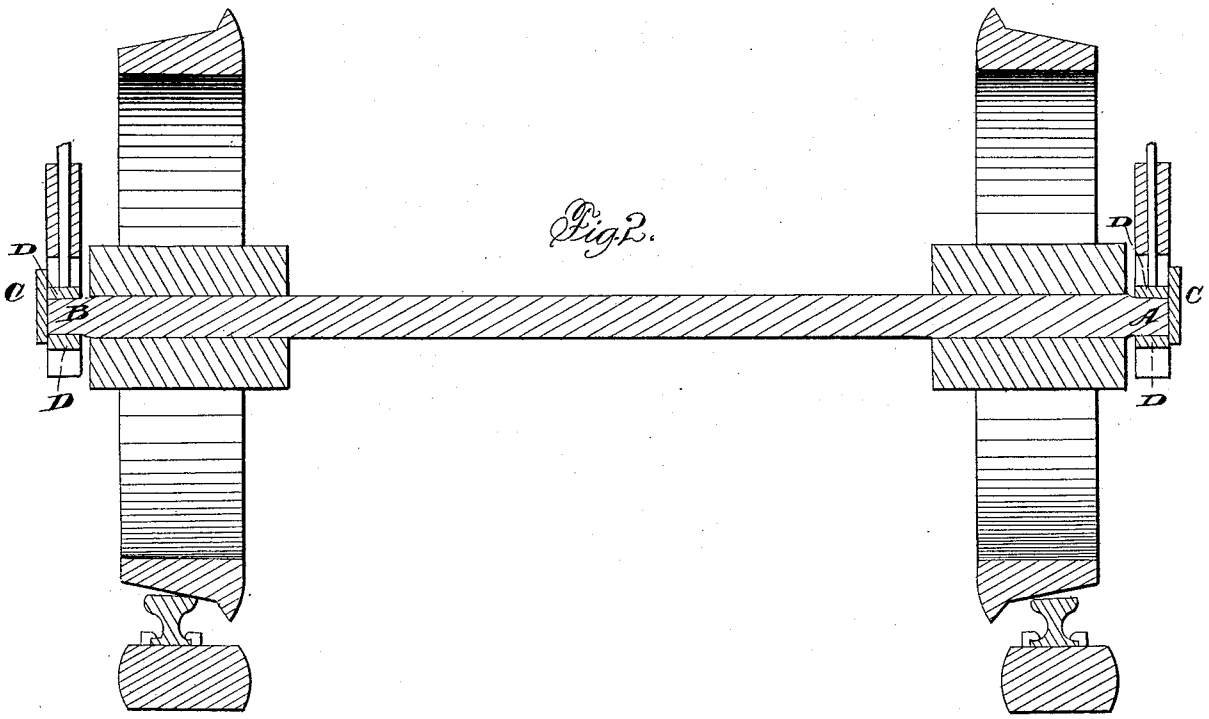
N. PETERS, PHOTO-LITHOGRAPHER, WASHINGTON, D. C.

MISSING PAGE TEMPORARY NOTICE

PATENT # 5404X FOR ISSUE DATE 3-18-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text